United States Patent [19]
Mohorovich

[11] 3,952,374
[45] Apr. 27, 1976

[54] ANTI-SPLATTER CLIP

[76] Inventor: Victor P. Mohorovich, 2119 46th Ave., San Francisco, Calif. 94116

[22] Filed: Dec. 9, 1974

[21] Appl. No.: 530,676

[52] U.S. Cl................................ 24/73 B; 220/85 CH
[51] Int. Cl.² ................ A44B 21/00; B65D 7/42
[58] Field of Search .............. 220/85 CH, 369; 24/73 B, 81 B, 84 B

[56] References Cited
UNITED STATES PATENTS

| 1,619,573 | 3/1927 | Haines | 220/85 CH |
| 1,928,995 | 10/1933 | De Biasi | 220/85 CH |
| 2,541,604 | 2/1951 | Normandin | 220/85 CH |
| 2,879,915 | 3/1959 | Medor | 220/85 CH |

FOREIGN PATENTS OR APPLICATIONS 389,201  3/1933  United Kingdom ............ 220/85 CH Primary Examiner—Donald A. Griffin
Attorney, Agent, or Firm—Robert Charles Hill

[57] ABSTRACT

An anti-splatter clip suitable for use with cooking pots and lids to prevent steam build-up is provided with a short run, an inner run extending perpendicular from the short run, a connecting run extending perpendicular from the inner run, an ear-shaped run extending above the connecting run and terminating below the short run, and an abutment run extending from the ear-shaped run. The clip fits over the rim of a cooking pot and is intermediate the lid and the pot.

6 Claims, 6 Drawing Figures

ANTI-SPLATTER CLIP

BACKGROUND OF THE INVENTION

An anti-splatter clip fits over the rim of a cooking pot and elevates the lid from the rim. The clip prevents steam build-up within the pot and the resultant overflow of liquid onto the heating apparatus.

SUMMARY OF THE INVENTION

It is well-known that covered cooking utensils used for boiling foods often bubble over from the pressure of accumulating steam. Many attachments for cooking utensils have been designed to hold a lid at an angle or partially opened position so as to prevent boiling over of the contents of the cooking utensil. This provides a vent for the steam to escape, thereby preventing steam build-up and the resultant boiling over.

Two major problems have been encountered with the lid supports or cooking utensil attachments of the past. One drawback is that the prior art devices were not designed to fit the large variety of cooking pots on the market and in use at the present time. The other difficulty is that these old devices created too large a vent, thus increasing the required cooking time while allowing a large area surrounding the cooking utensil to become damp from condensed steam.

Applicant has overcome the above problem by providing an antisplatter clip which fits over the rim of any popular cooking pot while providing a small vent between the lid and the cooking pot.

It is the primary object of the present invention to provide a new and improved anti-splatter clip.

Another object is to provide an anti-splatter clip which can fit on a variety of cooking pots.

A further object of the invention is to provide structure of the character described which is economical to produce and long lasting in usage.

DESCRIPTION OF THE PREFERRED EMBODIMENT

Figure 1:
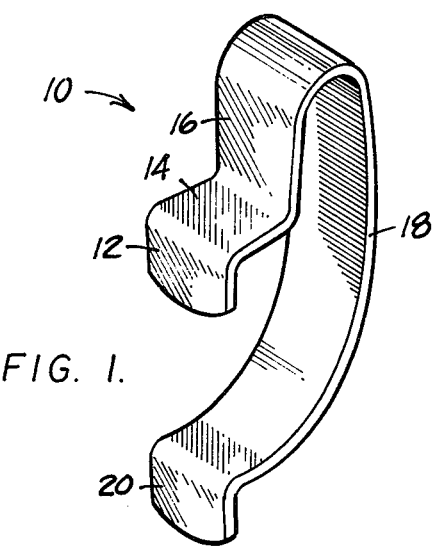
FIG. 1 is a perspective view of the anti-splatter clip.

Referring to FIG. 1 of the drawing, there is shown the anti-splatter clip of this invention, generally indicated 10, which is adaptable for use on a variety of cooking utensils such as cooking pots, sauce pans, and corning ware. The anti-splatter clip 10 has a short run 12 and an inner run 14 extending perpendicular therefrom. A connecting run 16 extends perpendicular from the inner run 14 and an ear-shaped run 18 extends above the connecting run 16 and terminates below the short run 12. A terminating or abutment run 20 extends from the ear-shaped run 18.

There are other relationships which are of interest in the anti-splatter clip 10. Thus, it can be seen that short run 12 extends perpendicularly downward from inner run 14 while connecting run 16 extends perpendicularly upward therefrom. Also, the abutment run 20 extends downward from the ear-shaped run 18 and perpendicular to the inner run 14. In addition, the ear-shaped run 18 terminates between the short run 12 and the connecting run 16.

The anti-splatter clips 10 are preferably extruded. They may be formed of aluminum or some other metal such as stainless steel. The clips 10 may be of many different widths and thicknesses. In practice, a width of ⅜ and a thickness of 1/16 inch works very satisfactorily.

Figure 2:
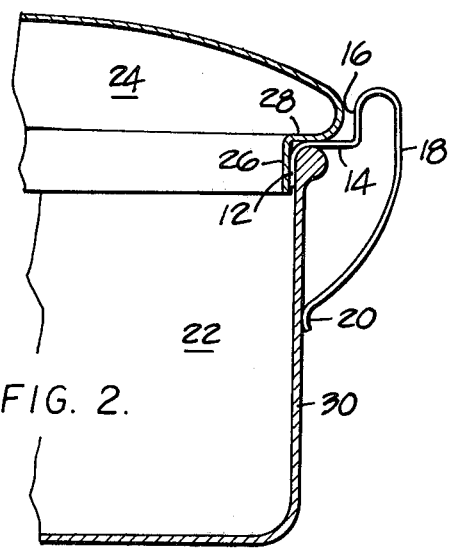
FIG. 2 is a fragmentary side view of a cooking pot and lid illustrating the anti-splatter clip of the present invention installed therein.

Typical installations for the anti-splatter clip of the present invention are shown in FIGS. 2 through 6 wherein the clip 10 is intermediate the cooking utensil 22 and the corresponding lid 24. In FIG. 2 one portion 26 of the lid 24 is adjacent the short run 12 and another portion 28 of the lid 24 rests on the inner run 14. In all the figures, the abutment run 20 rests against the side 30 of the cooking utensil 22.

Figure 3:
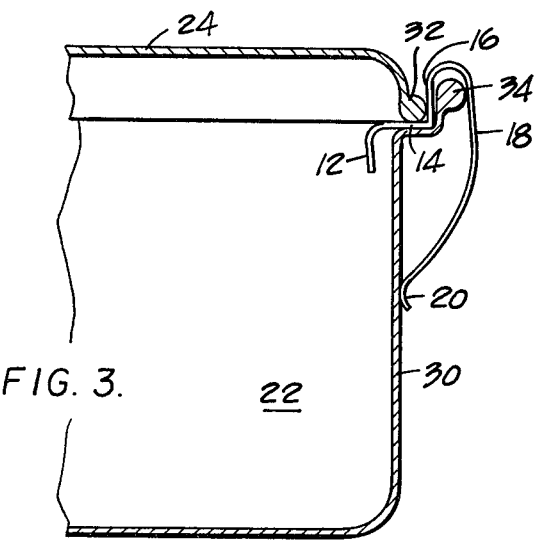
FIG. 3 is a side view of the anti-splatter clip installed on a relatively old cooking pot.
Figure 4:
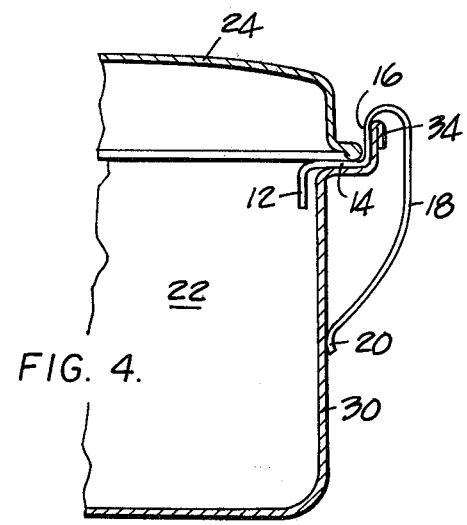
FIG. 4 is a side view of the anti-splatter clip installed on a stainless steel cooking pot.
Figure 5:
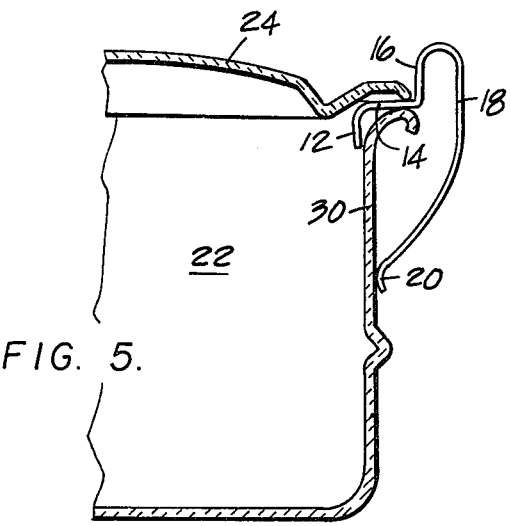
FIG. 5 is a side view of the anti-splatter clip installed on a sauce pan.
Figure 6:
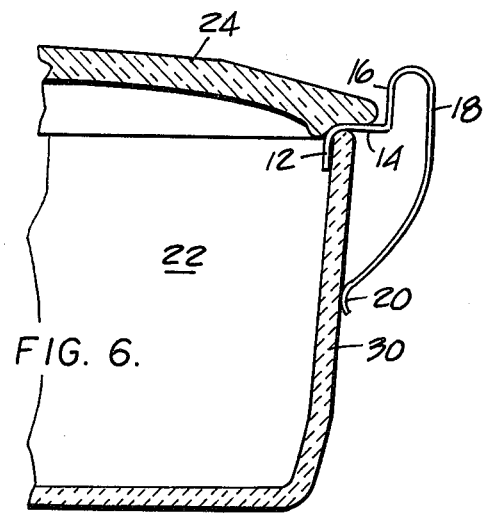
FIG. 6 is a side view of the anti-splatter clip installed on a corning ware pot with a glass cover thereon.

FIGS. 3 and 4 show a portion 32 of the lid 24 resting on the inner member 14 and connecting run 16 and ear-shaped run 18 rising above the upper portion 34 of the side 30. FIGS. 5 and 6 illustrate other vessels with the lid or cover 24 resting on the inner run 14. It can thus be seen that the anti-splatter clip 10 is designed to fit over a great variety of cooking utensil sides or rims thereby providing a vent for steam release.

It should also be pointed out that the anti-splatter clip 10 can help in draining liquid from the cooking utensil 22. When the clip 10 is positioned at the area where the liquid is to be poured from the utensil 22, the liquid can safely and easily be poured off because the lid 24 is not displaced from its normal position as the connecting run 16 and inner run 14 tend to prevent accidental slipping thereof.

I claim:

1. An anti-splatter clip suitable for use with many different sized cooking pots and lids to prevent steam build-up, comprising:
  a. a short run,
  b. an inner run extending perpendicular from said short run,
  c. a connecting run extending perpendicular from said inner run,
  d. an ear-shaped run extending above said connecting run and terminating below said short run, said inner run being greater in length than the parallel distance between said connecting run and said ear-shaped run, and
  e. an abutment run extending from said ear-shaped run.

2. The anti-splatter clip of claim 1 wherein the short run extends perpendicularly downward from said inner run.

3. The anti-splatter clip of claim 1 wherein the connecting run extends perpendicularly upward from said inner run.

4. The anti-splatter clip of claim 1 wherein the abutment run extends downward from said ear-shaped run.

5. The anti-splatter clip of claim 1 wherein the abutment run extends perpendicular to said inner run.

6. The anti-splatter clip of claim 1 wherein the ear-shaped run terminates between said short run and connecting run.

\* \* \* \* \*